Aug. 5, 1958 M. D. NELSON 2,846,617

AUTOMATIC DEFLECTION AMPLITUDE CONTROL APPARATUS

Filed Feb. 19, 1954

INVENTOR.
Morris D. Nelson
BY [signature]
ATTORNEY

United States Patent Office 2,846,617

Patented Aug. 5, 1958

2,846,617

AUTOMATIC DEFLECTION AMPLITUDE CONTROL APPARATUS

Morris D. Nelson, Bronx, N. Y., assignor to Radio Corporation of America, a corporation of Delaware Application February 19, 1954, Serial No. 411,406

6 Claims. (Cl. 315—24)

Figures 1, 2:
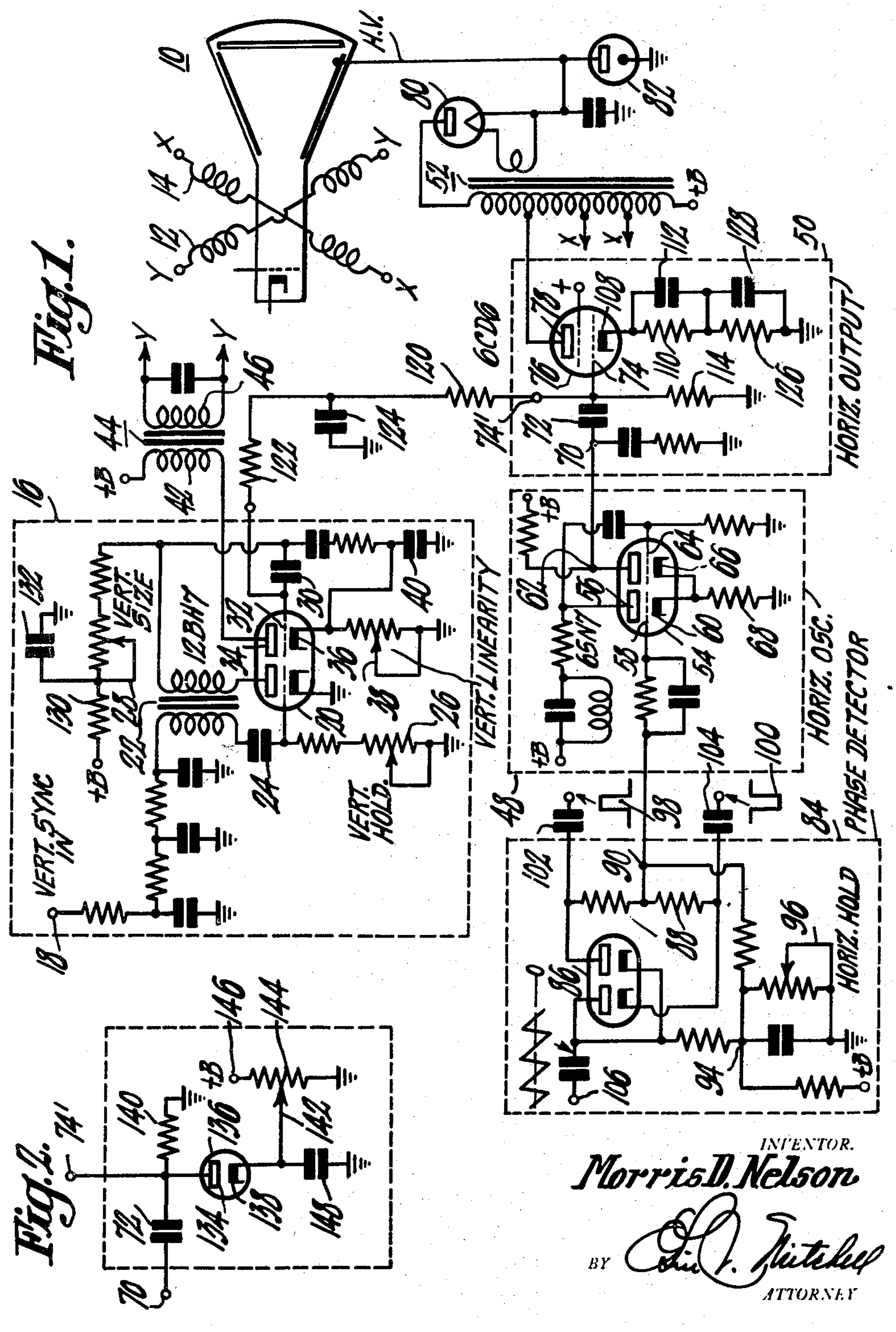

The present invention relates to novel apparatus for automatically controlling deflection amplitude in a cathode ray tube device and, more particularly, to apparatus which is particularly well suited for use with television kinescope deflection circuits.

As is now well known, it is customary in the television art to establish amplitude limits for the height and width of the area scanned by the deflection beam or beams within the image reproducing kinescope, the ratio of one such amplitude limit to the other being termed the "aspect ratio." The limits of the aspect ratio are established inter alia to afford the most efficient use of the cathode ray tube screen area for image reproduction. If one of the dimensions (e. g. height) changes with respect to the other dimension, there results an objectionable distortion in the image.

In receivers in which the high voltage supply for the image reproduction kinescope is not regulated or in which the regulation is fixed as in the case of a simple "corona" regulator, changes in height and aspect ratio accompany line voltage changes, since such changes in line voltage necessarily affect the B+ operating voltages which are applied to the various tubes of the circuit. While changes in width as a function of line voltage changes and B+ variations are not desirable, it has been found that coincident variations in raster height are quite objectionable by comparison. Although the use of a high voltage regulator such as the corona type will effectively control picture (i. e. raster) size as a function of brightness variations, where a non-regulated B+ supply is employed in a receiver, the horizontal and vertical deflection amplitudes will change when there occurs a change in the B+ voltage. Such a change in the deflection amplitude is, as stated, undesirable because of its effect upon the aspect ratio of the image area.

It is, therefore, a primary object of the present invention to provide novel means for controlling and maintaining substantially constant the aspect ratio in a cathode ray tube, despite changes in line voltage and B+ supply.

A further object of the invention is the provision of raster aspect ratio controlling means which serves automatically to prevent changes of vertical deflection amplitude with respect to horizontal deflection amplitude, even in the presence of line voltage variations.

Still another object of the invention is the provision of means as set forth which require the addition of only a few inexpensive components to existing types of television receivers.

In general, the present invention contemplates the application to a gain-controlling point in the vertical deflection generating circuit of a television receiver of a control voltage which reflects variations in line and B+ voltages. In accordance with a specific embodiment of the invention, the control voltage is obtained from a point in the horizontal deflection output stage where there is present a bias voltage which changes with variations in B+ but more rapidly percentagewise than such B+ variations. In that specific embodiment, the bias voltage is applied to the control electrode of the vertical deflection output amplifier.

Additional objects and advatages of the present invention will become apparent to persons skilled in the art from a study of the following detailed description of the accompanying drawing, in which:

Figure 1 is a schematic diagram of television receiver circuitry embodying the principles of the invention, and Figure 2 is a similar illustration of another form of the invention.

Referring to the drawing, and particularly to Figure 1 thereof, there is illustrated that portion of a television receiver having to do with the vertical and horizontal deflection of the cathode ray beam (not shown) of a kinescope 10. Specifically, such mutually perpendicular deflections of the electron beam are afforded by the magnetic fields produced, respectively, by the vertical and horizontal deflection windings 12 and 14 which are illustrated as being operatively associated wtih the kinescope 10. That is to say, the vertical winding 12 is energized normally and in the usual manner by field-frequency saw-tooth curents applied to it by means of the apparatus shown within the dotted line rectangle 16, while the horizontal winding 14 is energized by line frequency saw-tooth currents supplied by the remaining apparatus of Figure 1. The vertical deflection energy is derived in the following manner and, since the circuitry is conventional, the description need not be detailed:

Vertical frequency synchronizing pulses (not shown) are derived from the received composite television signal and applied to the input terminal 18 of circuit 16. These pulses serve to control the frequency of operation of a vertical blocking oscillator comprising the left-hand portion of the double triode 20. Since the operation of the blocking oscillator is well known, it is sufficient to note here that the anode and control electrode of the oscillator are regeneratively coupled by means of transformer 22 and that the blocking action is afforded by capacitor 24 which is in the circuit of the control electrode. A vertical hold control comprises a variable resistor 26 connected between the control electrode of the blocking oscillator and a point of fixed potential (i. e. ground) for varying the bias on the oscillator which, in turn, determines the point of conduction therefor. A vertical size control 28 is provided in the form of a variable resistor connected in the anode circuit of the blocking oscillator for adjustment of its B+ potential. The saw-tooth waveform produced by the blocking oscillator is applied via capacitor 30 to the control eelctrode 32 of the vertical output amplifier tube which further includes an anode 34 and cathode 36. The vertical output amplifier is also conventional in form and includes a linearity control 38 in the form of a variable resistor in the cathode circuit for effecting changes in the wave form at the cathode 36. Cathode 36 is bypassed to ground by capacitor 40. The anode circuit of the vertical output amplifier includes the primary winding 42 of an output transformer 44 whose secondary winding 46 is connected via terminal Y—Y to the vertical deflection winding 12.

While neither the specific vertical deflection circuit nor the horizontal deflection circuit constitutes a part of the present invention, the two circuits are illustrated in detail herein in the interest of completeness of disclosure.

Horizontal deflection energy for the winding 14 is provided by means of the horizontal deflection oscillator 48 which produces a saw-tooth waveform (not shown). The horizontal saw-tooth waveform is amplified by an output stage 50 and coupled as by means of transformer 52 and terminals X—X to the horizontal winding. The horizontal oscillator illustrated is in the form of the well known "Potter" oscillator comprising the two halves of a double triode 54 which are connected to operate as a cathode-coupled multivibrator. The left-hand portion of the double tube 54 comprising anode 56, control electrode 58 and cathode 60 constitutes one of the two tubes of the multivibrator, as may be seen from the drawing. The sawtooth output waveform of multivibrator 48 is available at terminal 62 at the anode of the tube which further includes a control electrode 64 and cathode 66. The two cathodes 60 and 64 are connected to ground through a common resistor 68.

The saw-tooth waveform at terminal 62 is applied to the input terminal 70 of the horizontal output stage 50 and is coupled by means of capacitor 72 to the control electrode 74 of the horizontal output amplifier tube 76. The anode 78 of amplifier 76 is connected directly to a point on the horizontal output transformer 52, as shown. A stepup winding of transformer 52 supplies flyback pulses to a high voltage rectifier 80 which provides the beam-accelerating potential to kinescope 10. The high voltage supply is illustrated as being regulated by the simple corona regulator 82.

It will further be noted that the horizontal oscillator 48 is controlled as to timing by means of the phase detector circuit 84 which is well known and includes a pair of diodes 86 whose common load resistance 88 is center-tapped at the terminal point 90. Point 90 is connected to a bias terminal 94 which is variable by means of the variable resistor or horizontal hold control 96. Point 90 is further connected to the control electrode 58 of the horizontal oscillator 48. In the operation of the horizontal oscillator and phase detector, positive and negative polarities 98 and 100 of the received horizontal sync pulses are applied to the phase detector via capacitors 102 and 104, respectively, while the staw-tooth waveform of horizontal frequency developed by the receiver is applied to terminal 106. As will be understood by those familiar with the art, the operation of the phase detector is such that, when pulses 98 and 100 coincide with the zero point of the saw-tooth wave form applied to terminal 106, no output signal is available at terminal 90. When, however, there is lack of coincidence, the voltage at point 90 varies in amplitude and sense, depending upon the phase of the pulses with respect to the saw-tooth wave. This error voltage is applied to the control electrode 58 of the horizontal oscillator to change its bias whereby to adjust the timing of the oscillator. It should be noted, however, that the bias voltage applied to control electrode 58 affects only the timing of the multivibrator 48, and not the amplitude of its output waveform. This fact is of importance and will be explained in greater detail hereinafter.

As thus far described, the circuitry of Figure 1 is conventional and may be found embodied in commercial, present-day television receivers. As will be appreciated, each of the tubes comprising the various horizontal and vertical deflection stages is supplied with its operating potentials from the B+ terminal, which potentials are subject to variations in line voltage. Hence, any such line voltage change will result in changing the gain of the various tubes in such manner as to alter the operation of the circuits. At this point, it is to be noted that the horizontal output amplifier 76 normally includes in series with its cathode 108 a cathode biasing arrangement comprising the parallel combination of resistor 110 and capacitor 112 which serve to protect the amplifier 76 in the event of failure of the horizontal oscillator to provide the saw-tooth signal or "drive." The operating bias for amplifier 76 is developed primarily, however, by virtue of its grid-rectifying action which causes a voltage to be developed across the grid resistor 114 when the driving voltage is sufficient in amplitude to cause the flow of grid current therethrough. That is to say, in the normal operation of the horizontal output amplifier 76, a grid bias is developed across resistor 114 which determines the operating characteristic of the tube. When the grid drive (i. e. amplitude of the applied saw-tooth wave) increases beyond the established level, as by reason of a fluctuation in the line voltage resulting in an increased B+ potential in the amplifiers and oscillators, the amount of grid current drawn by amplifier 76 also increases and serves to increase the bias of that tube sufficiently to compensate for the increased drive. Thus the grid rectifying action of tube 76 serves to maintain the horizontal deflection amplitude within a narrow range, despite wide fluctuation in line and B+ voltages. The vertical deflection circuits, however, do not include a corresponding "limit control," so that the amplitude of vertical deflection is ordinarily capable of varying greatly as the line and B+ voltages fluctuate. It is, as has been stated supra, a primary object of the present invention to provide means for preventing changes in vertical amplitude, so that the aspect ratio of the raster produced by kinescope 10 will remain substantially constant. This object is attained in the following manner: It has already been noted that the cathode-biasing arrangement including the parallel combination of resistor 110 and capacitor 112 provides an effect which may be thought of as a "threshold," below which grid current is not drawn by the amplifier 76. When the amplitude of the drive signal applied to control electrode 74 exceeds the cathode bias, however, grid current is drawn by the tube and a bias is rapidly built up across the grid resistor 114. Such grid bias is, moreover, non-linear in that, once it begins to develop, it rises more rapidly percentagewise than the increase of the drive signal. This non-linearity is dependent upon the provision of the cathode bias, for otherwise the saw-tooth drive signal applied to control electrode 74 would be linear with respect to line voltage and the grid rectification signal on the control electrode would also be linear. That is, in the absence of cathode-biasing the operation of the tube would be such that, as the input signal increases, the grid current would increase to produce a greater bias. Since the actual biasing of the tube constitutes the difference between the control electrode voltage and the cathode voltage, and since the cathode 108 in Figure 1 is maintained (through the agency of resistor 110) at some voltage positive with respect to ground, it will be understood that the percentage increase of grid bias, once grid current commences, is much greater than if there were no cathode-biasing.

In view of the foregoing facts, it has been found by the present applicant that the potential at the control electrode 74 (terminal 74') reflects changes in line and B+ voltage in an almost exponential manner and is, therefore, an extremely advantageous source of correction signal for maintaining the vertical deflection circuits substantially constant as to amplitude. Thus there is provided in the apparatus of Figure 1 an electrical path comprising resistors 120 and 122 between terminal 74' at the control electrode of the horizontal output amplifier and the control electrode 32 of the vertical deflection amplifier. A capacitor 124 connected between the junction of resistors 120 and 122 and a point of fixed potential (i. e. ground) completes the electrical circuit which serves to apply the bias developed by the horizontal output tube to the control electrode of the vertical output tube. Resistors 120 and 122 serve as a direct current path, while capacitor 124 filters the horizontal frequency saw-tooth component present at terminal 74'. The filtering action at capacitor 124 is important, for otherwise the horizontal frequency would interfere with the proper operation of the vertical deflection amplifier.

In the operation of the circuitry according to the invention, changes in line and B+ voltage will be reflected with magnification at terminal 74' by reason of the bias developed through grid rectification in amplifier 76. Assuming that the fluctuation is in the direction of an increased line voltage, so that the drive on control electrode 74 increases beyond the bias established by the cathode circuit of amplifier 76, the negative potential at terminal 74' will increase rapidly and render control electrode 32 of the vertical deflection amplifier more negative, thereby decreasing its gain in an amount sufficient to compensate for the increased line voltage. In order to increase the rate at which the bias is developed at terminal 74', an additional parallel combination of resistor 126 and capacitor 128 is provided in series with cathode 108 and its usual cathode biasing circuit 110, 112. It will be understood that the increased cathode bias moves upwardly the "threshold" beyond which grid rectification occurs in tube 76.

As a safeguard against vertical height changes with sudden line voltage fluctuations, the anode circuit of the vertical deflection oscillator includes, as shown, the combination of resistor 130 and capacitor 132 which affords a long time constant filtering of B+ potential.

While the foregoing discussion has described the operation of the present invention, certain additional points should be borne in mind. For example, the horizontal oscillator is provided with a horizontal hold control 96 of a conventional type, the function of the hold control being that of varying the timing of the horizontal oscillator. The oscillator and hold control illustrated are suitable for use with the present invention, since variation of the hold control changes only the timing of the horizontal oscillator (by varying the bias on control electrode 58 of the oscillator) and does not change the amplitude of oscillation. This feature is important, since it would be undesirable for the horizontal hold control to vary the amplitude of the drive applied to the horizontal output amplifier, as will be appreciated. While the multivibrator or Potter type oscillator and phase detector illustrated are suitable, it should be realized that any conventional oscillator and hold control may be employed, provided that the hold control is not of such variety as will change the amplitude of the drive signal which is applied to the output tube. Thus, for example, another form of horizontal oscillator which may be advantageously employed in an arrangement embodying the principles of the present invention is the "synchroguide" horizontal oscillator of the type described in U. S. Patent No. 2,633,538, granted March 31, 1953, to S. I. Tourshou for "Beam Deflection Control."

Another form of the invention is illustrated in Figure 2 wherein terminals 74' and 70 correspond to the terminals in Figure 1 bearing those reference characters. In the circuit of Figure 2, therefore, it will be understood that terminal 70 is adapted to be connected to the output of the horizontal oscillator, while terminal 74' is adapted for connection to a filtered direct current path such as that comprising resistors 120 and 122 and capacitor 124 of Figure 1. A coupling capacitor 72 is connected between terminal 70 and the anode 134 of a diode 136 which also includes a cathode 138. The anode 134 is also connected via resistor 140 to ground. Cathode 138 is connected via the adjustable tap 142 to a point on the voltage dividing resistor 144 connected between terminal 146 (+B) and ground. A bypass capacitor 148 is also connected between cathode 148 and ground, so that the cathode 138 is bypassed for horizontal frequencies.

In the operation of the circuit of Figure 2, the positioning of tap 142 on voltage divider 144 will determine a bias for cathode 138. With the application of horizontal deflection drive to terminal 70, the diode 136 will not draw current until the amplitude of the saw-tooth drive signal at anode 134 exceeds the bias on cathode 138. When, however, there occurs an upward change in the drive amplitude such as would be caused by an increased line voltage, the diode 136 will conduct whereby to develop a voltage across resistor 140 which rises non-linearly, in the manner of the bias voltage developed on the control electrode 74 in Figure 1. This negative voltage at the anode of diode 136 is available at terminal 74' and is, therefore, applied to the control electrode 32 of the vertical output amplifier. By reason of the bias on cathode 138 which is afforded by voltage divider 144, the threshold of conduction of diode 136 may be adjusted to a point such that the biasing voltage developed at terminal 74' is sufficiently non-linear to produce the necessary change of bias on the control electrode of the vertical amplifier.

From the foregoing, it will be appreciated that the present invention provides simple and inexpensive means for use with conventional cathode ray tube deflection apparatus and which functions to control vertical deflection amplitude in such manner that it does not vary when line and B+ voltages change. This control is, moreover, derived from a point in the horizontal deflection circuit whose potential varies non-linearly and rapidly as a function of line voltage changes. By virtue of the present invention raster aspect ratio may be maintained substantially constant despite the fact that line voltages are poorly regulated or unregulated.

Having thus described my invention, what I claim as new and desire to secure by Letters Patent is:

1. In television apparatus having a cathode ray image tube which includes a target and means for directing an electron beam toward such target, vertical deflection means including an amplifier for deflecting such beam across such target at television field rate, horizontal deflection means including an amplifier for deflecting such beam at television line rate and in a direction substantially perpendicular to the direction of such field rate deflection, such amplifiers being adapted to be furnished with operating potentials from a voltage source inherently subject to undesirable fluctuations, said horizontal deflection amplifier having self-biasing means whereby it is substantially self-regulating with respect to such voltage fluctuations, means for rendering the amplitude of such vertical deflection substantially independent of such voltage fluctuations, said means comprising: a conduction-controlling electrode in said vertical deflection amplifier; means coupling said self-biasing means in said horizontal deflection amplifier to said conduction-controlling electrode whereby to apply to said electrode a direct current voltage proportional to the bias developed by said means.

2. In combination with television apparatus having a cathode ray image tube which includes a target and means for directing an electron beam toward said target, vertical deflection means including an amplifier for deflecting such beam at a television field rate, horizontal deflection means including a deflection oscillator having an output terminal and an amplifier for deflecting such beam at a television line rate and in a direction substantially perpendicular to the vertical deflection, said vertical deflection means and horizontal deflection means being supplied with operating potentials from a power supply subject to undesirable voltage changes, means for maintaining substantially constant the aspect ratio of such vertical and horizontal deflections despite such voltage changes said means comprising: a conduction controlling electrode in said vertical amplifier, rectifying means connected to such oscillator output terminal and having a bias level, said rectifying means having a load impedance; and means defining a direct current coupling between said load impedance and said vertical amplifier conduction-controlling electrode.

3. The invention as defined by claim 2 wherein said amplifier included in said horizontal deflection circuit comprises a cathode, anode and control electrode, and wherein said rectifying means comprises said cathode and control electrode.

4. The invention as defined by claim 2 wherein said rectifying means comprises an electron valve including a cathode and an anode, means connecting said anode to said oscillator output terminal and means for biasing said cathode.

5. In television apparatus having a cathode ray image tube which includes a target and means for directing an electron beam toward such target, vertical deflection means including an amplifier having a conduction-controlling electrode for deflecting such beam at a television field rate, horizontal deflection means including an oscillator having an output terminal for deflecting such beam at a television line rate, said vertical and horizontal deflection means being supplied with operating potentials from a power supply inherently subject to voltage variations, apparatus for rendering the ratio of the amplitudes of such vertical and horizontal deflections substantially independent of such voltage variations, said apparatus comprising: an electron discharge device having an electron emitting electrode and an electron-collecting electrode; means coupling said oscillator output terminal to said electron collecting electrode; means including a parallel combination of resistance and capacitance connected between said electron emitting electrode and a point of reference potential for biasing said device to an established level; a resistive load impedance connected serially between said electron-collecting and electron-emitting electrodes; and filter means coupling said electron collecting electrode to said conduction-controlling electrode of such vertical deflection amplifier.

6. In television apparatus having a cathode ray image tube which includes a target and means for directing an electron beam toward such target, vertical deflection means including an amplifier for deflecting such beam across such target at television field rate, said amplifier having a cathode, control grid and anode, horizontal deflection means including an amplifier for deflecting such beam at television line rate and in a direction substantially perpendicular to the direction of such field rate deflection, said horizontal deflection amplifier comprising a cathode, control grid and anode and arranged in a circuit of such character as to draw grid current for self-biasing, said amplifiers being adapted to be furnished with operating potentials from a voltage source inherently subject to undesirable fluctuations, said horizontal deflection amplifier self-biasing arrangement being of such character as to render said horizontal deflection amplifier substantially self-regulating with respect to such voltage fluctuations, means for rendering the amplitude of such vertical deflection substantially independent of such voltage fluctuations, said means comprising: a circuit coupling said control grid of said horizontal deflection amplifier to said vertical deflection amplifier for applying a direct current voltage between said cathode and control grid of said vertical deflection amplifier, said applied voltage being proportional to the amount of grid current drawn by said horizontal deflection amplifier.

References Cited in the file of this patent

UNITED STATES PATENTS 2,675,423 Kirkness --------------- Apr. 13, 1954

OTHER REFERENCES

Rider's Television Manual vol. 10, Philco TV, pages 10–41; copyrighted November 21, 1952.